Oct. 3, 1967 D. G. SHUDA 3,345,578

REDUNDANT AMPLIFIER CIRCUITS

Filed March 9, 1964

INVENTOR.
DONALD G. SHUDA

BY Spencer E. Olson

ATTORNEY.

United States Patent Office 3,345,578
Patented Oct. 3, 1967

3,345,578

REDUNDANT AMPLIFIER CIRCUITS

Donald G. Shuda, Clarence Center, N.Y., assignor to Sylvania Electric Products Inc., a corporation of Delaware Filed Mar. 9, 1964, Ser. No. 350,405
10 Claims. (Cl. 330—22)

The present invention relates to circuits employing redundancy to improve reliability and is more particularly concerned with a standby form of redundancy as applied to a single amplifier stage or a string of cascaded amplifier stages.

Modern satellite and missile applications demand a very high degree of system reliability. It is desirable that electronic systems or circuits be capable of operating thousands of hours without failure, periods which may be longer than the mean time between failure of individual components of the circuits or system. As discussed in the "RADC Reliability Notebook." TR–58–111, Section 9, dated Dec. 31, 1961 (ASTIA Document No. 148868), one method of achieving the requisite high reliability in electronic systems is to employ circuit or system redundancy. The general redundancy techniques described include the use of operative redundancy and standby redundancy. In the case of operative redundancy, each circuit is paralleled with the same circuit and both are normally operated all the time. Failure of one of the paralleled circuits does not result in catastrophic failure since the other circuit takes over the function. In certain applications, however, it is desirable that the paralleled circuits not operate at all times because power consumption is doubled and may cause an undesirable amount of noise. Rather, it is often more advantageous to operate only one of the paralleled circuits, leaving the other on standby, and switching to the standby circuit, or an element of the circuit, in the event of failure of a circuit element. In solid state circuits, for example, one set of common electrodes of corresponding transistors in the paralleled circuits have been connected together through a diode switch. The operating voltages of the paralleled circuits under normal operation are such as to cut the idode off thereby to isolate one transistor from the other for direct current, but upon failure of the operating transistor, to drive the diode into conduction to switch the other transistor into operation. For the standby redundancy of a circuit stage or string of stages, elaborate isolation and switching circuitry including detectors, multivibrators and radio frequency switching apparatus is usually required.

Known implementations of the aforementioned standby redundancy techniques have several disadvantages. In the case of a simple standby element, such as a redundant transistor, a diode is required for isolation and switching, which in itself detracts from the reliability of the circuit; further, the design provides only for a transistor failure and not for failure of other circuit components in the stage. In the case of the standby stage or string of cascaded stages, the elaborate switching and isolation circuitry required detracts to a relatively large degree from the reliability and economy of the circuit; further, application to VHF power stages poses many difficult design problems. Also, the switching device or circuit significantly reduces the efficiency of the operating stage(s).

The aforementioned disadvantages are not present in the ideal case of standby redundancy where "perfect" switching is assumed. With "perfect" switching, the functions of isolation and switching are accomplished without the use of auxiliary isolation circuitry and a physical switching device.

In this instance, isolation means that degradation or failure in one circuit will not affect the output of the other circuit.

It is a primary object of the present invention to provide an improved standby redundancy design for amplifier circuits wherein nearly "perfect" switching is achieved.

Another object of the invention is to provide a practical standby redundancy design for amplifier circuits having improved reliability and efficiency.

A further object is to provide a relatively simple and inexpensive means for automatically switching a standby amplifier into operation in the event of failure of an associated amplifier and isolating the output of the circuit from the effects of the degradation or failure.

Briefly, in accordance with this invention, standby redundancy for amplifier circuits is accomplished by providing cross-biasing connections between the paralleled circuits to effect automatic switching, and isolation is provided by proper tuning of the output network of each parallel amplifier circuit. In a preferred embodiment, the paralleled amplifier circuits comprise first and second identical strings of cascaded transistor stages, each string including a final amplifier stage preceded by one or more driver stages. The emitter of the transistor in the final amplifier of the first string is connected to the emitter of a driver stage transistor in the second string, and the emitter of the final amplifier transistor in the second string is connected to the emitter of a driver stage transistor in the first string. The output coupling networks of the final amplifier stages are pre-tuned such that degradation or failure in one of the amplifier circuits (strings) will not have an intolerable effect upon the other. During normal operation, the first string is operating, and the emitter voltage of the first string final amplifier is used to bias the second string to the off condition. If a failure or serious degradation occurs in the first string, the loss of RF drive to the final amplifier stage, or certain failures in the final amplifier stage itself, causes a loss or decrease of the bias voltage holding the second string in the off condition. Once the bias drops below a selected level, the second string is automatically turned on. The resulting increase in the emitter voltage of the second string final amplifier is then used to automatically bias the first string to the off condition.

Other objects, features and advantages of the invention, and a better understanding of its organization and operation will become apparent from the following detailed description taken in conjunction with the accompanying drawings, in which.

The present invention is broadly concerned with a practical technique for providing near "perfect" switching for redundant amplifier circuits. As previously mentioned, this technique generally comprises cross biasing connections and utilization of the amplifier output networks for isolation. This "perfect" switching technique is equally applicable to a single amplifier stage or a multi-stage circuit string of cascaded connected amplifier stages.

Figure 1:
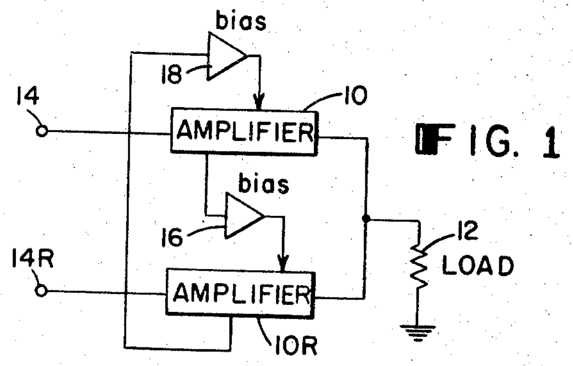
FIG. 1 is a block diagram of a redundant single amplifier stage embodying the invention.

Referring to FIG. 1, a standby redundancy arrangement embodying the invention is shown comprising a single amplifier stage 10 and an identical standby amplifier stage 10R connected to a common load represented by resistor 12. Terminals 14 and 14R, which may be common, represent signal sources connected to the input terminals of amplifiers 10 and 10R. Consider that each amplifier has an electrode exhibiting a voltage change in response to the condition of operation of the amplifier and an electrode which, upon application of a bias voltage, controls the condition of operation of the amplifier.

Let the former be called the bias generating electrode, and let the latter be called the bias controlled electrode. To provide a switching function between amplifiers 10 and 10R, therefore, a cross biasing arrangement is employed wherein the bias generating electrode of amplifier 10 is connected through an amplifier 16 to the bias controlled electrode of amplifier 10R, and the bias generating electrode of amplifier 10R is connected through a separate amplifier 18 to the bias controlled electrode of amplifier 10.

The cross biasing operates in much the same manner as a flip-flop, and can be unbalanced so as to present one stable state. Thus, during normal operation, amplifier 10 might always be first to operate and amplifier 10R remain in standby. In this condition, the bias voltage generated by the operating amplifier 10 is used to bias standby amplifier 10R to the off condition. Upon failure or serious degradation of performance in amplifier stage 10, in most cases there will be a loss or decrease of the bias voltage holding amplifier 10R in the off condition, and once the bias drops below a certain level, amplifier 10R is turned on. The increased bias voltage generated by the operating amplifier 10R is then used to bias amplifier 10 to the off condition. Isolation from the failed stage is provided by the pretuned output networks of the amplifiers, in a manner to be discussed in detail hereinafter in connection with FIG. 3.

Figure 2:
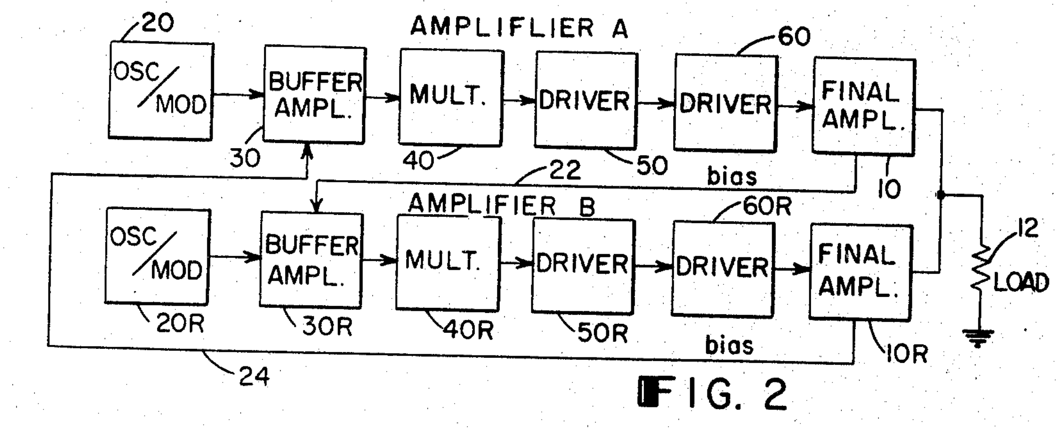
FIG. 2 is a block diagram of a redundant multi-stage amplifier embodying the invention.

Referring now to FIG. 2, a multi-stage embodiment of the invention is shown comprising amplifier A and standby amplifier B connected to a common load 12. Amplifier A comprises final amplifier 10 preceded by a string of cascade connected driver stages; in this example, the driver stages consist of an oscillator modulator 20, a buffer amplifier 30, a multiplier 40, and two driver amplifiers 50 and 60. Amplifier B comprises an identical string of cascaded signal processing stages, with corresponding stages identified by the same reference numerals followed by the letter R. To provide a switching function between amplifiers A and B, the bias generating electrode of final amplifier 10 and the bias controlled electrode of one of the driver stages of amplifier B, in this instance, buffer amplifier 30R, are connected together via connection 22, and the bias generating electrode of final amplifier 10R and the bias controlled electrode of buffer amplifier 30 are connected together via connection 24.

The cross biasing operation for FIG. 2 is similar to that described for the single stage arrangement of FIG. 1. During normal operation, amplifier A may always be first to operate and amplifier B remain in standby. In this condition, the bias voltage generated by the operating final amplifier 10 is used to bias the input string of the standby amplifier B to the off condition. Upon occurrence of a failure or serious degradation in amplifier string A, the loss of RF drive to final amplifier 10, or certain failures in final amplifier stage 10 itself, causes a loss or decrease of the bias voltage holding amplifier string B in the off condition. When the bias drops below a selected level, string B is turned on. The increased bias voltage generated by the operating amplifier 10R is then used to bias string A to the off condition. Isolation from the failed stage is provided by the pretuned output networks of final amplifiers 10 and 10R, as will shortly be discussed in detail.

Figure 3:
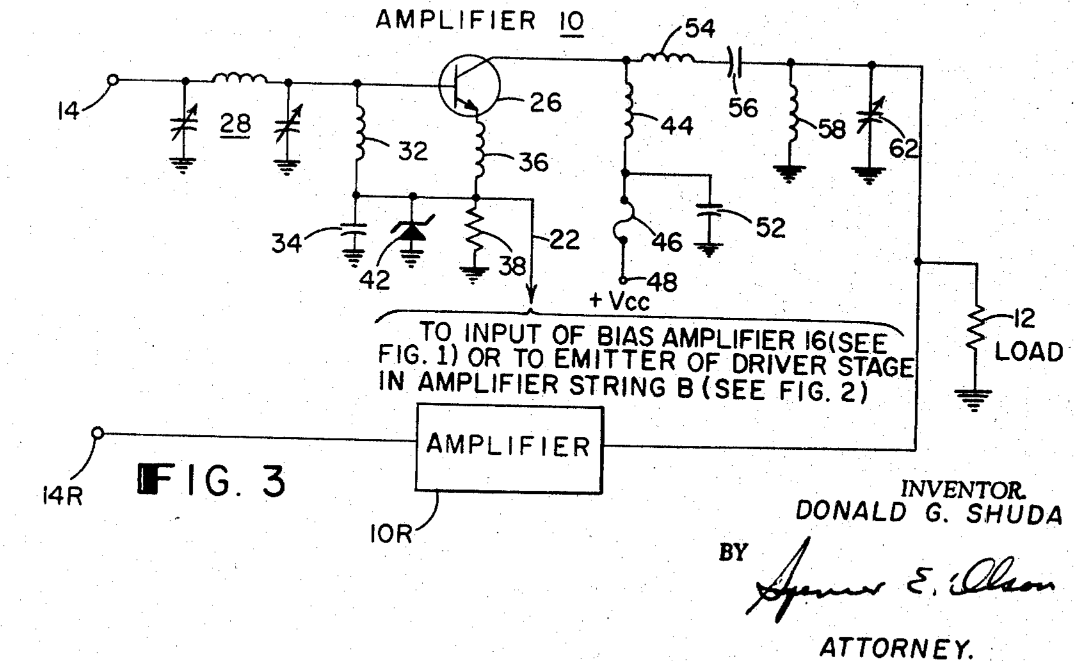
FIG. 3 is a circuit diagram of a redundant transistor amplifier stage useful in the circuits of FIGS. 1 and 2.

In FIG. 3, a circuit diagram of a transistor amplifier useful as amplifier stage 10 in FIGS. 1 and 2 is shown connected in parallel with a redundant amplifier 10R to a common load 12. Amplifier 10R is shown in block form since it is identical to amplifier 10 with the exception of the bias connection, as previously illustrated. Amplifier 10 comprises a transistor 26 connected in a grounded emitter amplifier configuration. An input signal source at terminal 14 is connected to the base electrode of transistor 26 through an impedance matching pi network 28. An RF choke 32 and bypass capacitor 34 are serially connected from the base of transistor 26 to ground. Inductor 36 and resistor 38 are serially connected from the emitter electrode of transistor 26 to ground. The junction of choke 32 and capacitor 34 and the junction of inductor 36 and resistor 38 are connected together, and a Zener diode 42 is connected between this common junction and ground.

When amplifier 10 is operating, the emitter voltage generated by transistor 26 appears as the voltage drop across resistor 38. Hence, in this grounded emitter amplifier, the emitter electrode is the bias generating electrode and is connected via inductor 36 and connection 22 to bias the opposite amplifier stage or string of stages. For example, considering the FIG. 1 configuration, conductor 22 couples the emitter voltage of amplifier 10 to the input of bias amplifier 16; the output of amplifier 16 is applied to a bias controlled electrode of amplifier 10R, which may be the emitter of a ground-emitter transistor amplifier.

In the multi-stage amplifier of FIG. 2, conductor 22 connects the emitter of transistor 26 to the emitter of a transistor in one of the driver stages in amplifier string B, for example, buffer amplifier 30R. Hence, resistor 38 is the common emitter resistor for both transistor 26 and the transistor in buffer amplifier 30R, and provides the means of detecting and stabilizing the emitter current to be used to keep only one of the redundant amplifier strings in operation. Zener diode 42 shorts excessive bias to ground to prevent it from damaging the standby amplifier or string of amplifiers.

The collector electrode of transistor 26 is connected through RF choke 44 and fuse 46 to a source of positive collector supply voltage, represented by terminal 48. Capacitor 52 is connected from the junction of choke 44 and fuse 46 to ground. An inductance 54 and DC blocking capacitor 56 are serially connected from the collector of transistor 26 to load 12, and choke 58 and variable capacitor 62 are connected in parallel to ground from the junction of capacitor 56 and load 12. Choke 58 shorts the collector supply to ground in the event of a short in capacitor 56, thereby protecting load 12 from unwanted DC voltage.

The output tank circuit of amplifier 10 comprises inductance 54 and variable capacitance 62. Contrary to conventional amplifier design, the output tank is not tuned to resonance at the operating frequency to thereby optimize the output, but is adjusted to provide isolation of the output. More specifically, the output tank circuits of amplifiers 10 and 10R are adjusted experimentally so that a degradation or failure in one amplifier circuit will not affect the power output of the other circuit. An illustration of the failure tolerance attainable by this final output tank tuning technique is provided by the following table of experimentally determined results. The table shows the effect on the normal amplifier power output $P_o$, from a specific type of component failure in the output circuit of amplifier 10, with amplifier 10R operating:

| Type of Failure | Component | $P_{load}$ |
|---|---|---|
| Short | Capacitor 62 | 0.9 $P_o$ |
| Open | do | 0.6 $P_o$ |
| Short | Inductance 54 | 0.3 $P_o$ |
| Open | do | 0.5 $P_o$ |
| Short (collector-emitter) | Transistor 26 | 0.9 $P_o$ |
| Open (collector-emitter) | do | 0.5 $P_o$ |

Failures in advance of transistor 26 are completely isolated from the output by amplifier stage 10. A design criteria of the standby redundant amplifiers from which the above data was obtained was that a drop of 50% in the output power level, from $P_o$ to 0.5 $P_o$, can be tolerated. As seen from the above table, the only component failure that causes a function failure is a short in inductance 54.

In operation, a sufficient decrease in the current through resistor 38, due to transistor or component failure in amplifier string A (or amplifier 10), will result in a decrease in the voltage drop across resistor 38 sufficient to cause amplifier string B (or amplifier 10R) to be biased into operation; activation of amplifier string B (or amplifier 10R) causes an increase in the current through the emitter resistor in amplifier 10R, thereby increasing the voltage drop there across to bias amplifier string A (or amplifier 10) to the off condition. The described isolation scheme insures that string A has little effect on the output of string B.

In circuit tests, satisfactory switching capability was demonstrated for the following types of failures: capacitor 62 short, capacitor 56 short, inductance 54 open and short, and transistor 26 collector-emitter open and short. The circuit will also provide switching for an open base-emitter diode in transistor 26 and any failure in stages preceding transistor 26.

The invention has been embodied in redundant VHF transistorized amplifier strings of the kind shown in FIG. 2 wherein load 12 comprises parallel power amplifier stages. The output frequency of oscillator-modulator 20 is 47 mc./s., which is multiplied to 141 mc./s. in tripler stage 40. Each final amplifier comprises the circuit shown in FIG. 3. The function of final amplifiers 10 and 10R is to provide further amplification for driving the subsequent power amplifier stages and to switch the standby string into operation in event of failure. The output of the redundant amplifier, with the final output tanks tuned to provide isolation, as described, is about 2 watts at 141 mc./s. If the final collector tanks were tuned for optimum output instead of isolation, the output of the amplifier would be about 4 watts with one watt input. Hence, switching between the redundant circuits is accomplished, not by a switching device, but by a common emitter connection and a circuit configuration which sacrifices output power for isolation of the two amplifiers, thereby enhancing overall reliability. Although designed as a redundant amplifier, the circuit has an efficiency of about 30%, nearly the efficiency for optimum non-redundant design conditions; if a switching device or circuit were used the efficiency would be reduced significantly.

The failure rate of the final VHF amplifier design shown in FIGS. 1 and 3 was calculated to be $0.37 \times 10^{-5}$. For a mission time of one year, the probability of success is 99.93 percent; for a 10-year mission time, the probability of success is 95.75 percent. The probability of success for the non-redundant version of the same VHF amplifier design is somewhat less for a one year period—96.8 percent, and substantially less for the 10-year period—72.31 percent.

Although the invention has been described in connection with redundant amplifiers employing transistor stages, it is to be understood that this is by way of example only, and that the invention is equally applicable to amplifier circuitry employing vacuum tubes. Likewise, the use of emitter voltages and connection of emitter electrodes for cross biasing is intended as typical for a specific amplifier arrangement, and not in a limiting sense; for example, collector electrodes might be interconnected. Accordingly, it is applicant's intention that the scope of his invention be limited only to the appended claims.

What is claimed is:

1. A standby circuit arrangement comprising first and second amplifier circuits having a common load and each having a final output coupling network connected to said common load, each of said final output coupling networks being tuned to prevent a degradation or failure in one of said amplifier circuits from having an intolerable effect upon the power output of the other, means including a third amplifier connected between an electrode of said first amplifier circuit and an electrode of said second amplifier circuit for coupling a bias feedback voltage from said first amplifier to said second amplifier, and means including a fourth amplifier connected between an electrode of said second amplifier circuit and an electrode of said first amplifier circuit for coupling a bias feedback voltage from said second amplifier to said first amplifier, said bias feedback voltages having relative values to normally cause operation of said first amplifier and to bias said second amplifier to the off condition, and upon occurrence of a failure in said first amplifier, to remove the bias holding said second amplifier in the off condition to thereby cause operation of said second amplifier and generation of a bias feedback voltage level sufficient to bias said first amplifier to the off condition.

2. A standby circuit arrangement comprising first and second amplifiers having a common load and each consisting of a single circuit stage including an active element having first, second and third electrodes, a signal source connected to said first electrode, and output coupling network connected between said second electrode and said common load, a source of reference potential, and a resistor connected between said third electrode and said source of reference potential, each of said output coupling networks being tuned to prevent a degradation or failure in one of said amplifiers from having an intolerable effect upon the power output of the other, means including a third amplifier connected between the third electrode of the active element in said first amplifier and an electrode of said second amplifier for biasing the operation of said second amplifier in response to the voltage drop across the resistor connected in said first amplifier, and means including a fourth amplifier connected between the third electrode of the active element in said second amplifier and an electrode of said first amplifier for biasing the operation of said first amplifier in response to the voltage drop across the resistor connected in said second amplifier, said bias voltages having relative values to normally cause operation of said first amplifier and to bias said second amplifier to the off condition, and upon occurrence of a failure in said first amplifier, to remove the bias holding said second amplifier in the off condition to thereby cause operation of said second amplifier and generation of a bias voltage level sufficient to bias said first amplifier to the off condition.

3. A standby circuit arrangement comprising first and second amplifiers having a common load and each comprising a multi-stage circuit of cascade connected signal circuit stages each including an active element having first, second and third electrodes, the final stage of each of said amplifiers including an output coupling network connected between the second electrode of its active element and said common load, a source of reference potential, and a resistor connected between the third electrode of its active element and said source of reference potential, the output coupling network of the final stage of each of said first and second amplifiers being tuned to prevent a degradation or failure in one of said amplifiers from having an intolerable effect upon the power output of the other, means connecting the third electrode of the active element in the final stage of said first amplifier to the third electrode of the active element in the first stage of said second amplifier for biasing the operation of said second amplifier in response to the voltage drop across the third electrode resistor in the final stage of said first amplifier, and means connecting the third electrode of the active element in the final stage of said second amplifier to the third electrode of the active element in the first stage of said first amplifier for biasing the operation of said first amplifier in response to the voltage drop across the third electrode resistor in the final stage of said second amplifier, said bias voltages having relative values to normally cause said first amplifier to be operative and said second amplifier to be biased to the off condition, and upon occurrence of a failure in said first amplifier, to remove the bias holding said second amplifier in the off condition thereby causing operation of said second amplifier and generation of a bias voltage level sufficient to bias said first amplifier to the off condition.

4. A standby circuit arrangement comprising first and second amplifiers having a common load and each comprising a multi-stage circuit of cascade-connected signal circuit stages each including an input circuit, an output circuit and an active element connected to process alternating current signals from said input circuit to said output circuit, the output circuit of the final stage of each of said first and second amplifiers being connected to said common load and tuned to prevent a degradation or failure in one of said amplifiers from having an intolerable effect upon the power output of the other, a source of reference potential, a first resistor, means connecting an electrode of the active element in the final stage of said first amplifier and an electrode of the active element in the first stage of said second amplifier through said first resistor to said source of reference potential, a second resistor, and means connecting an electrode of the active element in the final stage of said second amplifier and an electrode of the active element in the first stage of said first amplifier through said second resistor to said source of reference potential, the voltage drops across said first and second resistors having relative values during normal operation to cause said first amplifier to operate and said second amplifier to be biased to the off condition, and upon occurrence of a failure in said first amplifier, the voltage drop across said first resistor to be reduced sufficiently to cause operation of said second amplifier and an increase of the voltage drop across said second resistor to a level sufficient to cause said first amplifier to be biased to the off condition.

5. A standby circuit arrangement comprising first and second amplifiers having a common load and each consisting of a single circuit stage including a transistor having base, collector, and emitter electrodes, an input circuit connected to said base electrode, and output circuit connected between said collector electrode and said common load, a source of reference potential, and a resistor connected between said emitter and said source of reference potential, each of said output circuits being tuned to prevent a degradation or failure in one of said amplifiers from having an intolerable effect upon the power output of the other, means including a third amplifier connected between the emitter of said first amplifier and the emitter of said second amplifier for biasing the operation of said second amplifier in response to the emitter voltage of said first amplifier, and means including a fourth amplifier connected between the emitter of said second amplifier and the emitter of said first amplifier for biasing the operation of said first amplifier in response to the emitter voltage of said second amplifier, said emitter voltages having relative values during normal operation to cause said first amplifier to operate and said second amplifier to be biased to the off condition, and upon occurrence of a failure in said first amplifier, the emitter voltage of said first amplifier being reduced sufficiently to cause operation of said second amplifier and pursuant increase of the second amplifier emitter voltage to a level sufficient to cause said first amplifier to be biased to the off condition.

6. A stand-by circuit arrangement in accordance with claim 5 wherein said common load has first and second terminals, each of said output circuits is directly connected to the first terminal of said load, said second load terminal is connected to said source of reference potential and each of said output circuits is tuned away from resonance by an amount sufficient to prevent a degradation or failure in one of said amplifiers from having an intolerable effect upon the power output of the other.

7. A standby circuit arrangement comprising first and second amplifiers having a common load and each comprising a multi-stage circuit of cascade connected signal circuit stages each including an input circuit, an output circuit, and a transistor having base, collector, and emitter electrodes connected to process alternating current signals from said input circuit to said output circuit, the output circuit of the final stage of each of said first and second amplifiers being connected to said common load and tuned to prevent a degradation or failure in one of said amplifiers from having an intolerable effect upon the power output of the other, a source of reference potential, a first resistor, means connecting the emitter of the final stage of said first amplifier and the emitter of the first stage of said second amplifier through said first resistor to said source of reference potential, a second resistor, and means connecting the emitter of the final stage of said second amplifier and the emitter of the first stage of said first amplifier through said second resistor to said source of reference potential, the voltage drops across said first and second resistors having relative values during normal operation to cause said first amplifier to operate and said second amplifier to be biased to the off condition, and upon occurrence of a failure in said first amplifier, the voltage drop across said first resistor being reduced sufficiently to cause operation of said second amplifier and an increase in the voltage drop across said second resistor to a level sufficient to cause said first amplifier to be biased to the off condition.

8. A stand-by circuit arrangement in accordance with claim 7 wherein said common load has first and second terminals, said second load terminal is connected to said source of reference potential, and the output circuit of the final stage of each of said first and second amplifiers comprises an inductance and a direct current blocking capacitor serially connected in that order between the collector electrode of said final stage transistor and the first terminal of said load, and a choke and variable capacitor connected in parallel between said first load terminal and said source of reference potential, said variable capacitor being adjusted to tune the tank circuit formed by said inductance and said variable capacitance away from resonance by an amount sufficient to prevent a degradation or failure in one of said amplifiers from having an intolerable effect upon the power output of the other.

9. A stand-by circuit arrangement comprising first and second amplifier circuits having a common load and each comprising a multi-stage circuit of cascade-connected signal circuit stages having a final output coupling network connected to said common load, each of said final output coupling networks being tuned to prevent a degradation or failure in one of said amplifier circuits from having an intolerable effect upon the power output of the other, means connecting a bias feedback voltage from an electrode of the final stage of said first amplifier to an electrode of a stage of said second amplifier which precedes the final stage, and means connecting a bias feedback voltage from an electrode of the final stage of said second amplifier to an electrode of a stage of said first amplifier which precedes the final stage, said bias feedback voltages normally having relative values such that said first amplifier is operative and said second amplifier is biased to the off condition, and upon occurrence of a failure in said first amplifier, the bias holding said second amplifier in the off condition being removed thereby causing operation of said second amplifier and pursuant generation of a bias feedback voltage level from said second amplifier sufficient to bias said first amplifier to the off condition.

10. A stand-by circuit arrangement comprising first and second amplifier circuits having a common load and each having a final output coupling network, said common load having first and second terminals, each of said final output coupling networks being directly connected to the first terminal of said load, a source of reference potential, said second load terminal being connected to said source of reference potential, each of said final output coupling networks being tuned away from resonance by an amount sufficient to prevent a degradation or failure in one of said amplifier circuits from having an intolerable effect upon the power output of the other, a direct current circuit path connecting a bias feedback voltage from said first amplifier to said second amplifier, and another direct current circuit path connecting a bias feedback voltage from said second amplifier to said first amplifier, said bias feedback voltages normally having relative values such that said first amplifier is operative and said second amplifier is biased to the off condition, and upon occurrence of a failure in said first amplifier, the bias holding said second amplifier in the off condition being removed thereby causing operation of said second amplifier and pursuant generation of a bias feedback voltage level from said second amplifier sufficient to bias said first amplifier to the off condition.

References Cited

UNITED STATES PATENTS

| | | | |
|---|---|---|---|
| 2,004,107 | 6/1935 | Goldsmith | 330—124 |
| 2,319,320 | 5/1943 | Hepp | 328—224 |

ROY LAKE, *Primary Examiner.*

J. B. MULLINS, *Assistant Examiner.*